United States Patent
Mizumoto et al.

(10) Patent No.: US 9,672,870 B1
(45) Date of Patent: Jun. 6, 2017

(54) SEALED BULKHEAD ELECTRICAL FEED-THROUGH X-Y POSITIONING CONTROL

(71) Applicant: Western Digital Technologies, Inc., Irvine, CA (US)

(72) Inventors: Naoshi Mizumoto, Matsudamachi (JP); Naoaki Kanada, Fujisawa (JP); Mutsuro Ohta, Yokohama (JP); Gentaro Nakamura, Odawara (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/282,908

(22) Filed: Sep. 30, 2016

(51) Int. Cl.
  *G11B 33/12* (2006.01)
  *H01R 13/24* (2006.01)
  *H01R 12/52* (2011.01)
  *G11B 33/02* (2006.01)
  *G11B 33/14* (2006.01)

(52) U.S. Cl.
  CPC .......... *G11B 33/122* (2013.01); *G11B 33/022* (2013.01); *G11B 33/1466* (2013.01); *H01R 12/523* (2013.01); *H01R 13/2407* (2013.01)

(58) Field of Classification Search
  CPC ..... G11B 33/12; G11B 33/14; G11B 33/1466; H01R 12/00; H01R 12/523
  USPC ................... 360/99.2–99.25; 439/67, 310, 77
  See application file for complete search history.

(56) References Cited

U.S. PATENT DOCUMENTS

| | | | | |
|---|---|---|---|---|
| 5,357,386 | A * | 10/1994 | Haidari | G11B 5/4846 360/99.18 |
| 6,537,083 | B1 * | 3/2003 | Yatskov | H01R 12/52 439/310 |
| 6,721,135 | B2 | 4/2004 | Hong et al. | |
| 6,970,322 | B2 * | 11/2005 | Bernett | G11B 33/122 360/245.9 |
| 7,476,124 | B2 | 1/2009 | Mewes et al. | |
| 7,952,879 | B1 * | 5/2011 | Vinciarelli | H05K 7/209 165/185 |
| 8,007,327 | B2 | 8/2011 | Yang et al. | |
| 8,869,385 | B2 | 10/2014 | Chang et al. | |
| 2002/0055292 | A1 | 5/2002 | Maiers et al. | |
| 2009/0168233 | A1 * | 7/2009 | Kouno | G11B 33/1466 360/99.21 |
| 2012/0052747 | A1 * | 3/2012 | Kataoka | H01R 13/193 439/701 |

(Continued)

*Primary Examiner* — Allen T Cao
(74) *Attorney, Agent, or Firm* — John D. Henkhaus

(57) ABSTRACT

An electrical feed-through, such as a PCB connector, involves a connector part that includes a housing from which first and second positioning flanges extend from opposing ends. A data storage device includes an enclosure base with which the electrical feed-through is coupled, where the base comprises an annular recessed surface surrounding an aperture that is encompassed by the electrical feed-through, and first and second recessed positioning surfaces extending in directions outward from respective longitudinal ends of the annular recessed surface, where each of the recessed positioning surfaces has a corresponding wall extending vertically therefrom. When assembled, each positioning flange of the electrical feed-through mechanically mates with a corresponding recessed positioning surface of the base, such that the position of the electrical feed-through is constrained by the walls of each recessed positioning surface.

15 Claims, 5 Drawing Sheets

(56) References Cited

U.S. PATENT DOCUMENTS

2013/0314897 A1* 11/2013 Dal Ben ............. F21V 33/0044
                                                        362/91
2015/0098178 A1   4/2015 Otake et al.
2015/0124352 A1*  5/2015 Rothenberg ........... H05K 1/118
                                                        360/99.08
2015/0380851 A1* 12/2015 Zhao ................ H01R 13/5837
                                                        439/626
2016/0270173 A1*  9/2016 Xiong ............... H05B 33/0815

* cited by examiner

POSITION AN ADHESIVE ON AN ANNULAR RECESSED SURFACE OF AN ENCLOSURE BASE, WHEREIN THE ANNULAR RECESSED SURFACE IS STEPPED DOWN FROM A FIRST RECESSED POSITIONING SURFACE OF THE BASE
602

POSITION AN ELECTRICAL FEED-THROUGH IN A RECESS SURROUNDING AN APERTURE IN AN ENCLOSURE BASE, INCLUDING POSITIONING A FIRST POSITIONING FLANGE EXTENDING FROM A FIRST LONGITUDINAL END OF A HOUSING OF A CONNECTOR PART OF THE ELECTRICAL FEED-THROUGH ONTO A CORRESPONDING FIRST RECESSED POSITIONING SURFACE OF THE BASE, AND POSITIONING A SECOND POSITIONING FLANGE EXTENDING FROM A SECOND OPPOSING LONGITUDINAL END OF THE HOUSING OF THE CONNECTOR PART OF THE ELECTRICAL FEED-THROUGH ONTO A CORRESPONDING SECOND RECESSED POSITIONING SURFACE OF THE BASE, SUCH THAT THE POSITION OF THE ELECTRICAL FEED-THROUGH IS CONSTRAINED BY A FIRST OUTER WALL OF THE FIRST RECESSED POSITIONING SURFACE AND A SECOND OUTER WALL OF THE SECOND RECESSED POSITIONING SURFACE
604

SUBSTANTIALLY FILL A HERMETICALLY-SEALED ENCLOSURE COMPRISING THE BASE WITH A LIGHTER-THAN-AIR GAS
606

FIG. 6

SEALED BULKHEAD ELECTRICAL FEED-THROUGH X-Y POSITIONING CONTROL

FIELD OF EMBODIMENTS

Embodiments of the invention may relate generally to data storage devices and more particularly to controlling the positioning of an electrical feed-through.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. For example, operating an HDD in helium reduces the drag force acting on the spinning disk stack and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDDs is also increased due to low humidity, less sensitivity to altitude and external pressure variations, and the absence of corrosive gases or contaminants.

Electronic systems that require a hermetically sealed internal volume (e.g., a lighter-than-air gas filled, sealed HDD) need a way of connecting electrical lines through the enclosure. This is typically accomplished with a hermetic electrical connector, or electrical "feed-through" connector (or simply a "feed-through"). One possible approach may involve the use of a low permeability but relatively expensive feed-through, such as glass-metal feed-through. This type of feed-through typically includes straight pins on each side, and is typically soldered to the HDD base at the feed-through sidewall.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at an electrical feed-through, a data storage device comprising such a feed-through, and a method of assembling a data storage device comprising such a feed-through. The electrical feed-through may be referred to as a "printed circuit board (PCB) connector" in that it involves multiple insulating layers with electrical terminals on each side, at least some of which are interconnected by way of vias. This electrical feed-through comprises a connector part, which comprises a housing from which first and second positioning flanges extend from opposing ends.

The data storage device embodiment comprises an enclosure base with which the electrical feed-through is coupled, where the base comprises an annular recessed surface surrounding an aperture that is encompassed by the electrical feed-through, and first and second recessed positioning surfaces extending in directions outward from respective longitudinal ends of the annular recessed surface, where each of the recessed positioning surfaces has a corresponding wall extending vertically therefrom. When assembled, each positioning flange of the electrical feed-through mechanically mates with a corresponding recessed positioning surface of the base, such that the position of the electrical feed-through is constrained by the walls of each recessed positioning surface.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 6 is a flow diagram illustrating a method of assembling a data storage device, according to an embodiment.

DETAILED DESCRIPTION

Approaches to a well-positioned electrical feed-through are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of an electrical feed-through for a hard disk drive (HDD). Thus, in accordance with an embodiment, a plan view illustrating an HDD 100 is shown in FIG. 1 to illustrate an exemplary operating context.

Figure 1:
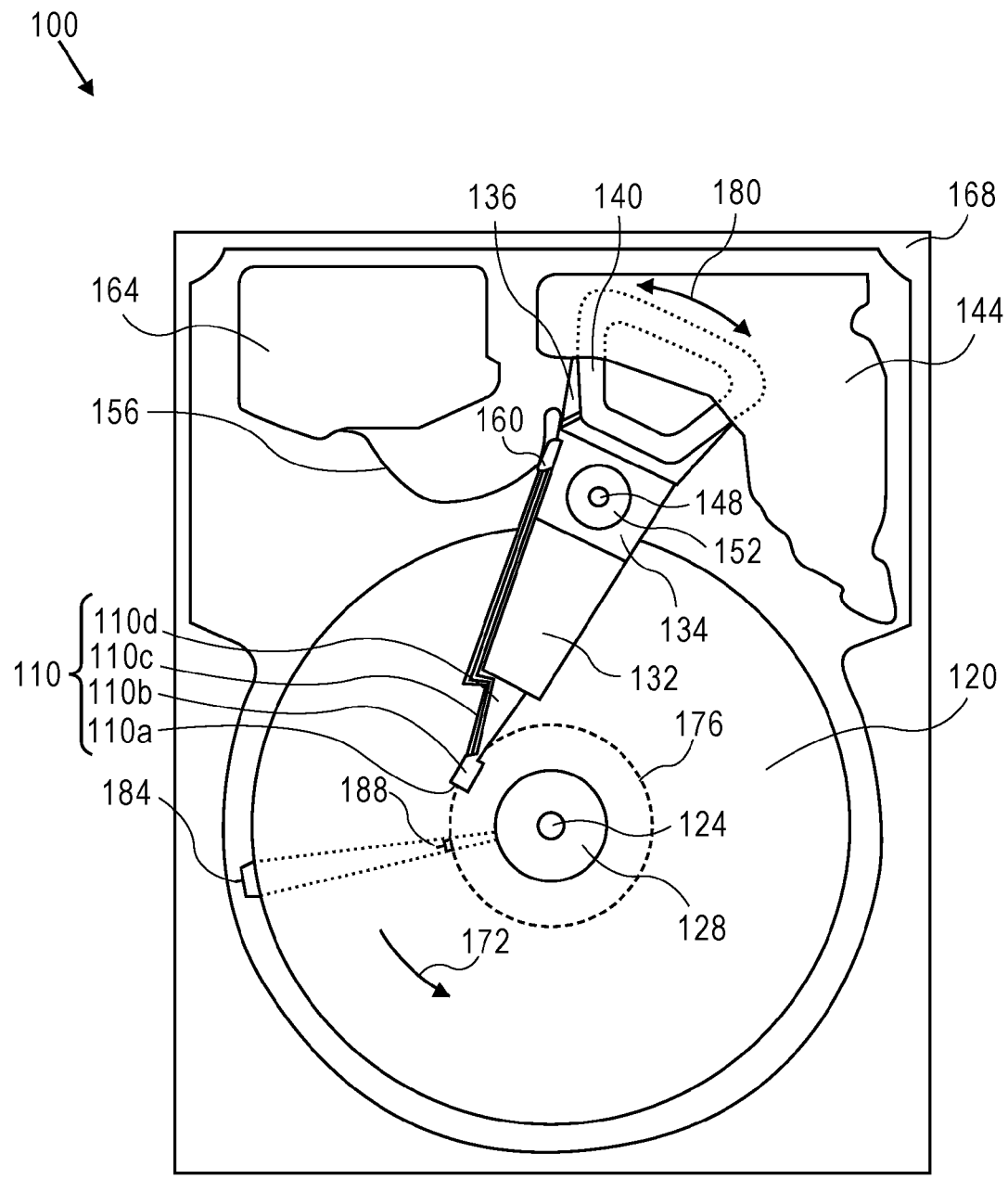
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak free. Hence, the concept of a desired or target "leak rate" may be referred to elsewhere herein. As discussed, electronic systems that require a hermetically sealed internal volume (e.g., a lighter-than-air gas filled, sealed HDD) need a way of connecting electrical lines through the enclosure, and there remains challenges regarding a low leakage rate versus the cost, manufacturability, and reliability of a suitable electrical feed-through.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Figure 2:
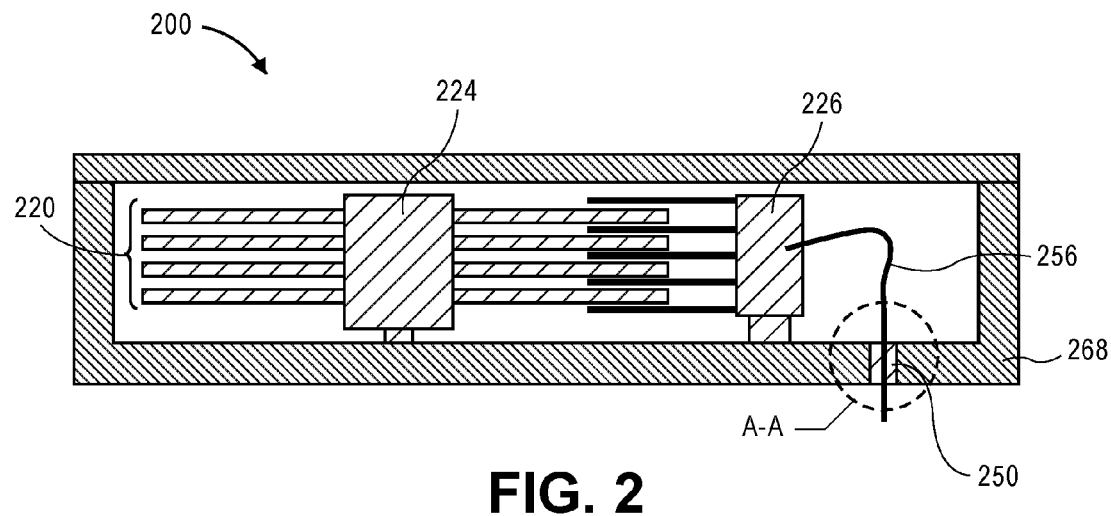
FIG. 2 is a cross-sectional side view illustrating a hard disk drive (HDD), according to an embodiment.

FIG. 2 is a cross-sectional side view illustrating a hard disk drive (HDD), according to an embodiment. For example, HDD 200 comprises at least one recording medium 220 (e.g., such as magnetic-recording medium 120 of FIG. 1) rotatably mounted on a spindle 224 (e.g., such as spindle 124 of FIG. 1) of a drive motor that drives the rotation of the recording medium 220, and a head stack assembly (HSA) 226 that carries and moves a head slider housing a read-write transducer to locations over the recording medium 220 for reading information from and writing information to the recording medium 220. HDD 200 further comprises a flexible cable assembly (FCA) 256 that electrically connects the HSA 226 to an electronic component external to the hermetically-sealed internal environment of HDD 200, such as to a printed circuit board (e.g., an "SOC", or system-on-a-chip) that may be coupled to the HDD 200. In so doing, the FCA 256 is routed through an interface 250 (e.g., mechanical and/or electrical), which includes a small opening, which is associated with an HDD enclosure base 268 (e.g., similar to a hermetically-sealed version of housing 168 of FIG. 1). FIG. 2 further illustrates an area A-A near and including the interface 250, which is referenced elsewhere herein.

As mentioned, in the context of a sealed hard disk drive, a hermetic electrical connector may be used to electrically connect (e.g., an internal flexible cable with an external onboard printed circuit board assembly), where one approach may involve the use of a low permeability but relatively expensive feed-through (e.g., a glass-metal feed-through), typically soldered to the HDD base at the feed-through sidewall. Alternatively, a printed circuit board-based (or "PCB-based) sealed bulkhead ("SBH") connector (or "feed-through") may be used, whereby an SBH connector may be attached to the base by soldering or adhesive affixing. An SBH feed-through is referred to herein as a PCB-based feed-through because it is typically fabricated using materials and processes generally associated with PCBs. One advantage of using PCB-based components, generally, and a PCB-based electrical feed-through, specifically, is the relatively low cost associated with a now mature fabrication approach.

With respect to an SBH connector, the sidewall is not useful for soldering because the SBH connector is a PCB and a solder pattern cannot practically be made on the PCB sidewall. Hence, solder or adhesive is typically applied between the bottom of the SBH connector and a base surface. More stringent positioning requirements may be associated with an SBH connector than with a glass-metal feed-through connector because a compression-type connector, which uses compression-type contact pins, may be used for electrical contacts between the SBH connector and the flex cable and/or the onboard PCB assembly. Thus, the positional relationship between the SBH connector and each of the flex cable and/or the PCB assembly should be held within a specified range suitable for the compression-type pins. Therefore, SBH connector positioning control is desirable.

Electrical Feed-Through with Connector Housing Positioning Flanges

Figure 3:
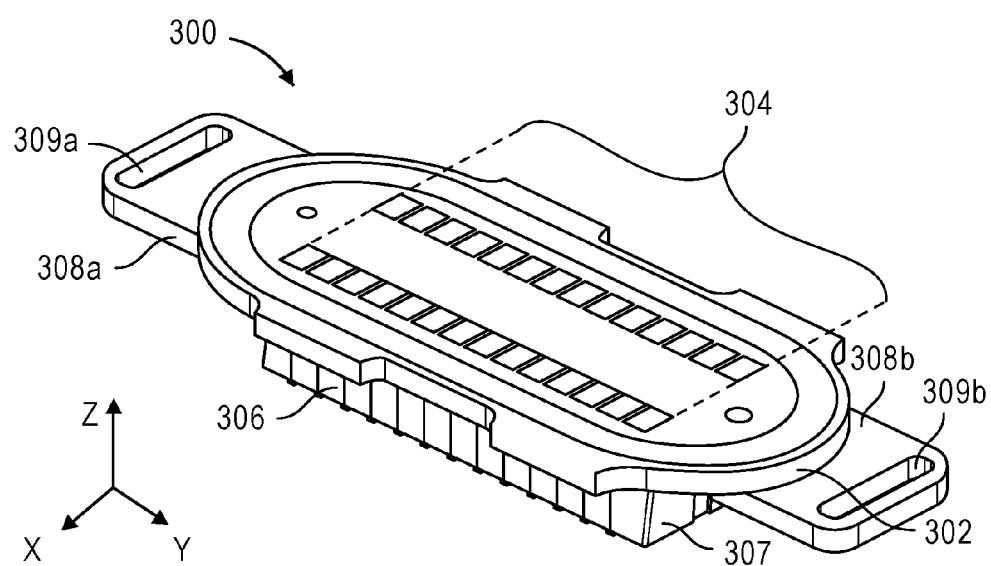
FIG. 3 is a perspective view of a sealed bulkhead electrical feed-through connector, according to an embodiment.

FIG. 3 is a perspective view of a sealed bulkhead electrical feed-through connector, according to an embodiment. Electrical feed-through 300 connector (hereinafter, "feed-through 300") may be referred to as a PCB (printed circuit board) based feed-through, fabricated using materials and processes generally associated with PCBs.

A PCB-based electrical feed-through such as feed-through 300 may comprise a laminate structure having one or more layers 302 of insulating material (e.g., FR-4 glass-reinforced epoxy, or plastic laminate), and a plurality of electrical terminals 304 (sometimes referred to generally as "electrical pads" or "electrical connections") on each of the top and bottom sides of the feed-through 300, where at least some of the corresponding electrical terminals 304 on the top and bottom sides may be electrically interconnected by way of a respective via through the layers 302.

According to an embodiment, the electrical terminals 304, at least on one of the top or bottom side of the feed-through 300, comprise solder pads. According to an embodiment, the electrical terminals 304 on both the top and bottom sides of the feed-through 300 comprise solder pads. According to an embodiment, the feed-through 300 further comprises a connector part 306, where the connector part 306 is electrically coupled and connected to the electrical terminals 304 on at least on one side of the feed-through 300. According to an embodiment, connector part 306 comprises a compression-type connector that has spring terminals (also referred to as "compression-type terminals" or "compression-type pins"), which is a style of connector that can be used to electrically connect to and communicate with a PCB.

The number of electrical terminals 304 constituent to an electrical feed-through such as feed-through 300 may vary from implementation to implementation. Thus, the number of electrical terminals 304 illustrated in FIG. 3 is arbitrary and for purposes of example only. Note also that an electrical feed-through such as feed-through 300 need not be shaped precisely as depicted in FIG. 3, but may vary from implementation to implementation based on, for example, the shape of the interface (e.g., interface 250 of FIG. 2) and the corresponding aperture of the base (e.g., aperture 402 of the base 400 of FIG. 4).

According to an embodiment, in addition to the compression-type terminals, the connector part 306 comprises a housing 307, from which a first positioning flange 308a extends from one end and a second positioning flange 308b extends from another opposing end. As is described in more detail elsewhere herein, each positioning flange 308a, 308b is shaped to mechanically mate with a correspondingly-shaped recess in an enclosure base (see, e.g., base 400 of FIG. 4), together which provides for positioning control of the feed-through 300 relative to the base. The precise shape of each positioning flange 308a, 308b may vary from implementation to implementation based on for example, available design space on the base for which the feed-through is designed, manufacturing constraints, cost, and the like. Furthermore, positioning flange 308a and positioning flange 308b need not be the same exact shape as one another. As depicted and according to an embodiment, each positioning flange 308a, 308b extends from the housing 307 at or near the side of the connector part 306 at which the connector part 306 is electrically connected to the electrical terminals 304, which is the side of the connector part 306 that is closest to the insulating layers 302.

According to an embodiment, at least one positioning flange 308a, 308b comprises a through-hole, such as through-hole 309a and/or through-hole 309b. A through-hole 309a, 309b can be useful for pre-fixing (e.g., temporarily affixing) the feed-through 300 to the base using, for example, an adhesive (e.g., an ultraviolet curable adhesive) applied through one or more through-hole 309a, 309b. Thus, such pre-fixing can temporarily hold in position at least one positioning flange 308a, 308b with a corresponding positioning surface of the base (see, e.g. surface 404a, 404b of FIG. 4), during the manufacturing process, for example. Alternatively, the through-hole 309a, 309b may be foregone for some other pre-fixing procedure, such as use of a fixing tool (e.g., a jig and screws).

Figure 4:
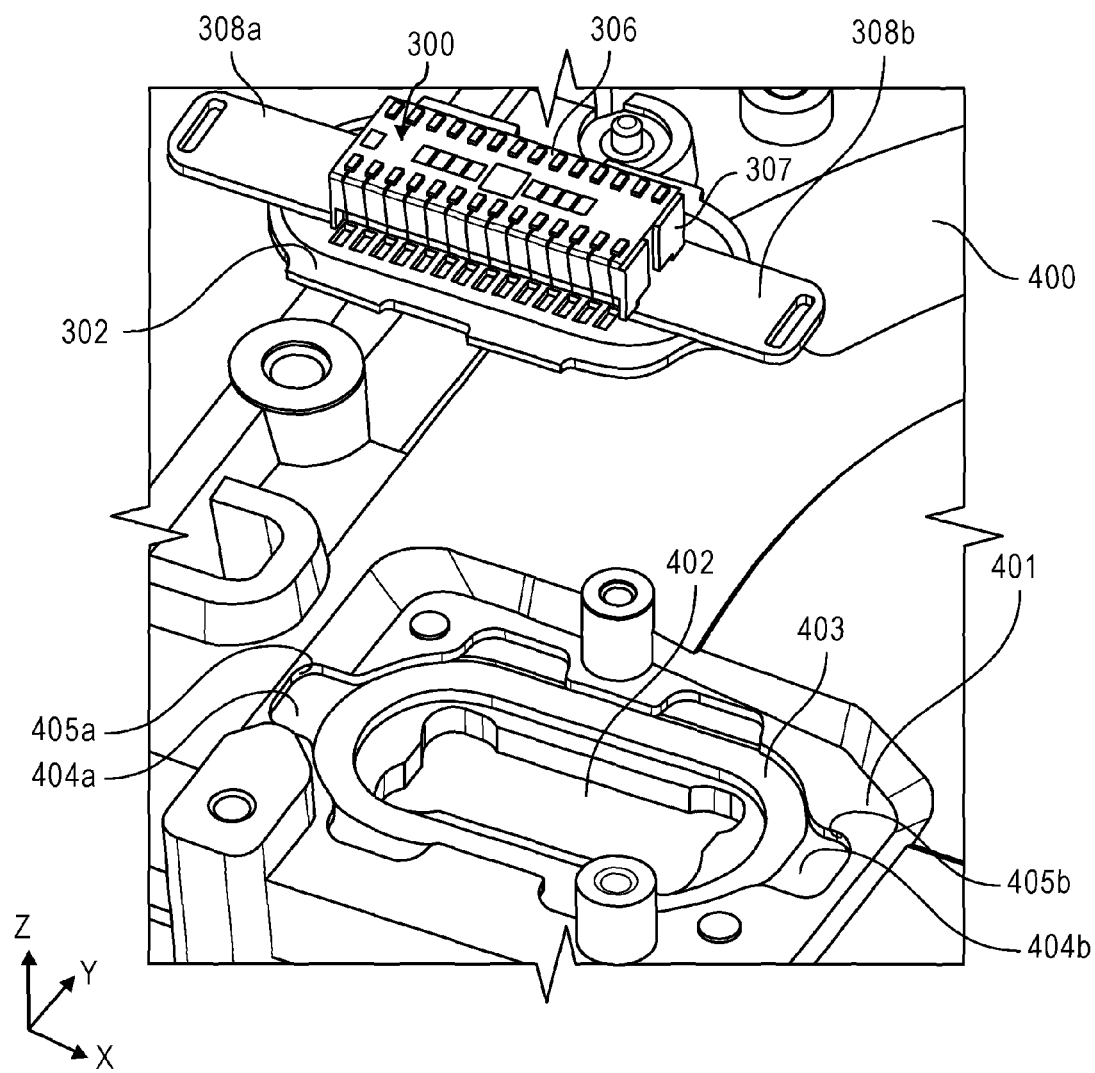
FIG. 4 is an exploded perspective view of a sealed bulkhead electrical feed-through connector and base, according to an embodiment.

Electrical Feed-Through with Connector Housing Positioning Flanges, Assembled with Base FIG. 4 is an exploded perspective view of a sealed bulkhead electrical feed-through connector and base, according to an embodiment. The assembly depicted exploded in FIG. 4 includes the SBH feed-through 300 exploded from enclosure base 400 (e.g., base 268 of FIG. 2), and will be described as if the feed-through 300 is assembled with the base 400. Note that the feed-through 300 is depicted in a position opposite from how feed-through 300 is depicted in FIG. 4 (e.g., upside down).

According to an embodiment, base 400 comprises an aperture 402 encompassed by the feed-through 300, an annular recessed surface 403 surrounding the aperture 402, and at least one recessed positioning surface 404a, 404b (collectively, recessed positioning surface 404) extending in a direction(s) outward from one longitudinal end of the annular recessed surface 403. According to an embodiment, there are as many recessed positioning surfaces 404 on base 400 as there are positioning flanges 308 (e.g., 308a, 308b) extending from housing 307 of connector part 306 of feed-through 300.

As shown, each of the annular recessed surface 403 and the recessed positioning surfaces 404a, 404b are recessed from a surrounding surface 401. According to an embodiment, the base 400 structure surrounding the aperture 402 is a stepped structure, in which the annular recessed surface 403 is at one level or plane and each recessed positioning surface 404a, 404b is at a second level, which is at a higher level or plane than the level of the annular recessed surface 403, all of which are recessed from the surrounding surface 501. As recessed surfaces, each recessed positioning surface 404a, 404b, comprises an outer wall 405a, 405b, respectively, extending vertically from the associated recessed positioning surface 404a, 404b.

As can be envisioned from FIG. 4, each positioning flange 308a, 308b of the connector part 306 of the feed-through 300 is intended to mechanically/physically mate with a corresponding recessed positioning surface 404a, 404b, respectively, in order to constrain (in a horizontal, or X-Y, plane) the positioning of the feed-through 300 relative to the base 400. For example, feed-through 300 comprises a first positioning flange 308a protruding from a longitudinal end of housing 307 of connector part 306 in a first direction and a second positioning flange 308b protruding from a second opposing longitudinal end of housing 307 in a second direction, and the base 400 comprises a corresponding first recessed positioning surface 404a extending in the first direction and a second recessed positioning surface 404b extending in the second direction, whereby the corresponding positioning structures are configured to mechanically mate such that in an assembled state (see, e.g., FIG. 5) the position of the feed-through 300 is constrained relative to base 400 by the corresponding outer walls 405a, 405b of each respective recessed positioning surface 404a, 404b.

Figure 5:
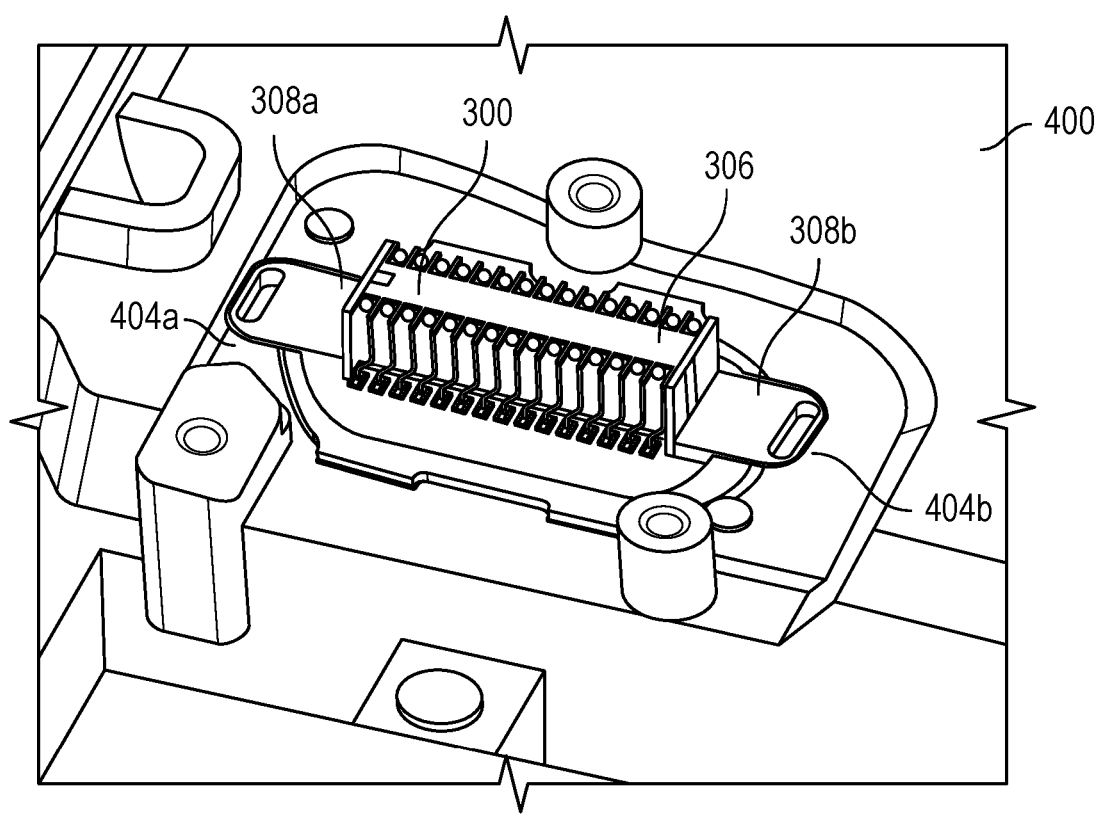
FIG. 5 is a perspective view of the sealed bulkhead electrical feed-through connector as assembled with the base, according to an embodiment.

FIG. 5 is a perspective view of the sealed bulkhead electrical feed-through connector as assembled with the base, according to an embodiment. The assembly depicted in FIG. 5 includes the SBH feed-through 300 seated with and coupled, adhered, affixed to the inside of an enclosure base 400. As described, according to an embodiment, there are at least as many recessed positioning surfaces 404a, 404b on base 400 as there are positioning flanges 308a, 308b on connector part 306 of feed-through 300, because each positioning flange 308a, 308b is intended to mechanically mate with a corresponding recessed positioning surface 404a, 404b (and at least very close to each respective outer wall 405a, 405b, e.g., within reasonable manufacturing and assembly tolerances) in order to control the positioning of the feed-through 300 relative to the base 400.

One possible implementation of a SBH electrical feed-through such a feed-through 300 may be for use with a sealed hard disk drive (HDD) that includes a hermetically sealed gas-filled (e.g., a lighter-than-air type gas, such as helium, nitrogen, etc., for non-limiting examples) enclosure that has an opening extending through an HDD base 400 (e.g., similar to a hermetically-sealed version of housing 168 of FIG. 1). In such an implementation, an electrical connector may be disposed inside the enclosure and adjacent to the opening, and which can be electrically connected to an electrical feed-through, such as feed-through 300, which spans the opening. For example, an electrical connector may be electrically connected with an internal HDD flexible interconnect cable (e.g., flex cable 156 of FIG. 1, flexible cable assembly 256 of FIG. 2), and with the feed-through 300 by way of electrical terminals 304. Alternatively, an internal HDD flexible interconnect cable may be directly connected with the feed-through 300 by way of electrical terminals 304. Broadly, feed-through 300 may facilitate electrical contact and connection between the outside and inside of the hermetically sealed cavity/enclosure. Thus, according to an embodiment, the structural configuration depicted in FIG. 5 is implemented in a data storage device (e.g., an HDD) having a hermetically-sealed enclosure, in which a lighter-than-air gas is contained.

A potential, non-limiting, benefit envisioned by the foregoing mating structures (i.e., positioning flanges 308a, 308b of SBH feed-through 300 and corresponding recessed positioning surfaces 404a, 404b and associated outer walls 405a, 405b of base 400) relates to manufacturing tolerance control, whereby because the recessed positioning surfaces 404a, 404b and outer walls 405a, 405b of base 400 may be formed by a machining process, the dimensional tolerances can be small and relatively well-controlled. Hence, the feed-through 300 X-Y direction positioning after affixation to the base 400 is likewise well-controlled and within small tolerances.

Method of Assembling a Data Storage Device

FIG. 6 is a flow diagram illustrating a method of assembling a data storage device, according to an embodiment. For example, the method of FIG. 6 could be employed to assemble feed-through 300 (FIG. 3) to enclosure base 400 (FIG. 4).

At an optional block 602 (depicted as optional with a dashed block), according to an embodiment, an adhesive is positioned on an annular recessed surface of an enclosure base, wherein the annular recessed surface is stepped down from a first recessed positioning surface of the base. For example, an adhesive (e.g., a preformed solder ring) may be positioned on annular recessed surface 403 (FIG. 4) of enclosure base 400 (FIGS. 4, 5), wherein the annular recessed surface 403 is stepped down from (i.e., lower than) the recessed positioning surfaces 404a, 404b (FIGS. 4, 5).

At block 604, an electrical feed-through is positioned in a recess surrounding an aperture in the base, including positioning a first positioning flange extending from a first longitudinal end of a housing of a connector part of the electrical feed-through onto a corresponding first recessed positioning surface of the base, and positioning a second positioning flange extending from a second opposing longitudinal end of the housing of the connector part of the electrical feed-through onto a corresponding second recessed positioning surface of the base, such that the position of the electrical feed-through is constrained by a first outer wall of the first recessed positioning surface and a second outer wall of the second recessed positioning surface of the base. For example, electrical feed-through 300 (FIGS. 3-5) is positioned in a recess surrounding an aperture 402 (FIG. 4) in the base 400, including positioning the first positioning flange 308a (FIGS. 3-5) extending from a first longitudinal end of the housing 307 (FIGS. 3, 4) of the connector part 306 (FIGS. 3-5) of the electrical feed-through 300 onto a corresponding first recessed positioning surface 404a (FIGS. 4, 5) of the base 400 (FIGS. 4, 5), and positioning the second positioning flange 308b (FIGS. 3-5) extending from a second longitudinal end of the housing 307 (FIGS. 3, 4) of the connector part 306 of the electrical feed-through 300 onto a corresponding second recessed positioning surface 404b (FIGS. 4, 5) of the base 400, such that the position of the electrical feed-through 300 is constrained by a first outer wall 405a (FIG. 4) of the first recessed positioning surface 404a and a second outer wall 405b (FIG. 4) of the second recessed positioning surface 404b of the base 400. In the context of optional block 602, the electrical feed-through 300 would be positioned, at block 604, onto the adhesive positioned at block 602.

According to an embodiment, the electrical feed-through 300 is configured to interface between a hermetically-sealed environment and an external environment. For example, the hermetically-sealed environment may be the internal cavity of a sealed hard disk drive having a lighter-than-air gas largely sealed therein. At optional block 606 (depicted as optional with a dashed block), according to an embodiment, a hermetically-sealed enclosure comprising the base is substantially filled with a lighter-than-air gas. For example, a hermetically-sealed HDD such as HDD 200 (FIG. 2) is fabricated having the feed-through 300 and base 400 as described herein, and is filled with a lighter-than air gas such as helium.

Extensions and Alternatives

Implementation and use of embodiments described herein are not limited solely to individual data storage devices or HDDs. Rather, embodiments involving the use of an electrical feed-through to enclosure base interface as described to provide a well-positioned and controlled hermetic interface seal, may also be applied to a system level sealed tray or box of multiple HDDs enclosed in a box containing gas like He or $N_2$, as well as to hermetically-sealed electronic devices, generally (e.g., optical systems, optical data storage devices, and the like).

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:
1. A data storage device comprising:
an electrical feed-through assembly comprising:
one or more layers of insulating material,
a plurality of first electrical terminals on one side of said insulating material;

a plurality of second electrical terminals on another opposing side of said insulating material,
a plurality of vias electrically connecting at least some of said first electrical terminals with corresponding said second electrical terminals through said one or more layers, and
an electrical connector part electrically coupled on one side with said first electrical terminals, said connector part comprising:
compression-type terminals on another opposing side of said connector part,
a housing,
a first positioning flange extending from one end of said housing, and
a second positioning flange extending from another opposing end of said housing; and
an enclosure base with which said electrical feed-through is coupled, said base comprising:
an aperture encompassed by said electrical feed-through,
an annular recessed surface surrounding said aperture,
a first recessed positioning surface extending in a direction outward from one longitudinal end of said annular recessed surface and with a first outer wall extending vertically from said first recessed positioning surface, and
a second recessed positioning surface extending in a direction outward from another opposing longitudinal end of said annular recessed surface and with a second outer wall extending vertically from said second recessed positioning surface;
wherein each said first and second positioning flange of said connector part mechanically mates with a corresponding said first or second recessed positioning surface of said base, such that the position of said electrical feed-through is constrained by said first and second walls of said base.

2. The data storage device of claim 1, wherein each said first and second positioning flange of said connector part extends from said housing at or near said one side of said connector part.

3. The data storage device of claim 1, wherein each said first and second recessed positioning surface of said base is at a higher level than said annular recessed surface of said base.

4. The data storage device of claim 1, wherein at least one of said first and second positioning flange of said connector part comprises a through-hole, through which an adhesive can be applied to at least temporarily hold in position said at least one positioning flange of said connector part with said corresponding positioning surface of said base.

5. The data storage device of claim 1, wherein each said first and second positioning flange of said connector part is shaped to mechanically mate with a correspondingly-shaped said positioning surface and corresponding outer wall of said base.

6. The data storage device of claim 1, further comprising:
an adhesive positioned between said annular recessed surface and said electrical feed-through and affixing said electrical feed-through to said base.

7. The data storage device of claim 1, wherein said base is part of a hermetically-sealed enclosure, said data storage device further comprising:
a lighter-than-air gas contained within said hermetically-sealed enclosure.

8. An electrical feed-through assembly comprising:
one or more layers of insulating material;
a plurality of first electrical terminals on one side of said insulating material;
a plurality of second electrical terminals on another opposing side of said insulating material;
a plurality of vias electrically connecting at least some of said first electrical terminals with corresponding said second electrical terminals through said one or more layers; and
an electrical connector part electrically coupled on one side with said first electrical terminals, said connector part comprising:
compression-type terminals on another opposing side of said connector part, a housing,
a first positioning flange extending from one end of said housing, and
a second positioning flange extending from another opposing end of said housing.

9. The electrical feed-through assembly of claim 8, wherein each said first and second positioning flange extends from said housing at or near said one side of said connector part.

10. The electrical feed-through assembly of claim 8, wherein at least one of said first and second positioning flange of said connector part comprises a through-hole.

11. The electrical feed-through assembly of claim 8, wherein each said first and second positioning flange is shaped to mechanically mate with a correspondingly-shaped recess in an enclosure base.

12. The electrical feed-through assembly of claim 8, wherein each said first and second electrical terminals comprises solder pads.

13. A method of assembling a data storage device, the method comprising:
positioning an electrical feed-through in a recess surrounding an aperture in an enclosure base, including positioning a first positioning flange extending from a first longitudinal end of a housing of a connector part of said electrical feed-through onto a corresponding first recessed positioning surface of said base, and positioning a second positioning flange extending from a second opposing longitudinal end of said housing of said connector part of said electrical feed-through onto a corresponding second recessed positioning surface of said base, such that the position of said electrical feed-through is constrained by a first outer wall associated with said first recessed positioning surface and a second outer wall associated with said second recessed positioning surface;
wherein said electrical feed-through comprises:
one or more layers of insulating material,
a plurality of first electrical terminals on one side of said insulating material,
a plurality of second electrical terminals on another opposing side of said insulating material,
a plurality of vias electrically connecting at least some of said first electrical terminals with corresponding said second electrical terminals through said one or more layers, and
an electrical connector part electrically coupled on one side with said first electrical terminals, said connector part comprising:
compression-type terminals on another opposing side of said connector part,
said housing,
said first positioning flange extending from one end of said housing, and said second positioning flange extending from another opposing end of said housing.

14. The method of claim 13, further comprising:
prior to positioning said electrical feed-through, positioning an adhesive on an annular recessed surface of said base, wherein said annular recessed surface is stepped down from said first and second recessed positioning surfaces;
wherein positioning said electrical feed-through includes positioning said electrical feed-through onto said adhesive.

15. The method of claim 13, wherein said base is part of a hermetically-sealed enclosure, the method further comprising:
substantially filling said hermetically-sealed enclosure with a lighter-than-air gas.

\* \* \* \* \*